US012004478B2

(12) United States Patent
Veness et al.

(10) Patent No.: US 12,004,478 B2
(45) Date of Patent: Jun. 11, 2024

(54) DOOR CONNECTOR FOR A LITTER CONTAINER

(71) Applicant: Doskocil Manufacturing Company, Inc., Arlington, TX (US)

(72) Inventors: David Veness, Fort Worth, TX (US); Mike Harper, Arlington, TX (US); Melaney Northrop, Mansfield, TX (US)

(73) Assignee: PLUTO OPCO (CAYMAN), LLC, Grand Cayman (KY)

( * ) Notice: Subject to any disclaimer, the term of this patent is extended or adjusted under 35 U.S.C. 154(b) by 872 days.

(21) Appl. No.: 16/944,446

(22) Filed: Jul. 31, 2020

(65) Prior Publication Data

US 2021/0029963 A1 Feb. 4, 2021

Related U.S. Application Data

(60) Provisional application No. 62/881,215, filed on Jul. 31, 2019.

(51) Int. Cl.
*A01K 1/01* (2006.01)
*E05D 7/10* (2006.01)
*E06B 3/70* (2006.01)

(52) U.S. Cl.
CPC .......... *A01K 1/0107* (2013.01); *E05D 7/1077* (2013.01); *E06B 3/70* (2013.01); *E05Y 2900/602* (2013.01); *E06B 2003/7046* (2013.01)

(58) Field of Classification Search
CPC .... A01K 1/0107; A01K 1/011; A01K 1/0114; E05D 7/1077; E05Y 2900/602; E06B 3/70; E06B 2003/7046
See application file for complete search history.

(56) References Cited

U.S. PATENT DOCUMENTS

| | | | | |
|---|---|---|---|---|
| 979,992 A * | 12/1910 | Niemann | ............... | A01K 31/18 119/493 |
| 2,395,726 A * | 2/1946 | Del Tufo | ........... | E04F 13/0839 52/509 |
| 5,178,100 A * | 1/1993 | Monk | .................. | A01K 1/0125 229/117.02 |
| 5,566,640 A * | 10/1996 | Krumrei | .............. | A01K 1/0107 119/165 |
| 6,298,808 B1 * | 10/2001 | Crafton | ................ | A01K 1/0107 119/165 |
| 9,107,383 B2 * | 8/2015 | Khalili | ................. | A01K 1/0114 |
| 9,713,315 B2 * | 7/2017 | Sweetman | ........... | A01K 1/0107 |
| 2008/0022938 A1 * | 1/2008 | Callan | .................... | A01K 1/011 119/165 |
| 2015/0320008 A1 * | 11/2015 | Northrop | .............. | A01K 1/0107 119/165 |
| 2017/0258032 A1 * | 9/2017 | Veness | ................. | A01K 1/0107 |

FOREIGN PATENT DOCUMENTS

WO WO-2009139775 A1 * 11/2009 ........... A01K 1/0236

* cited by examiner

*Primary Examiner* — Ebony E Evans
(74) *Attorney, Agent, or Firm* — GLOBAL IP COUNSELORS, LLP

(57) ABSTRACT

A door connector for a litter container includes a base portion and a hook. The base portion is configured to attach to an interior surface of a hood of the litter container. The hook is configured to attach to a cylindrical connector on the door. The base portion is configured to attach to the interior surface such that when connected the hook is at least partially hidden when viewed from an exterior of the litter container.

10 Claims, 7 Drawing Sheets

DOOR CONNECTOR FOR A LITTER CONTAINER

CROSS-REFERENCE TO RELATED APPLICATION

This application claims priority to U.S. Provisional Patent Application No. 62/881,215, filed Jul. 31, 2019, the contents of which are hereby incorporated herein by reference.

BACKGROUND

Field of the Invention

The present invention relates to a litter container. More particularly, the present invention relates to a door connector for a hooded litter container.

Background Information

It has become increasingly popular in the pet products field to provide covered litter containers. Typically, a covered litter container includes a bottom pan configured to contain litter and a top portion configured to sit on top of the bottom pan. The covered litter container can also include a door assembly that enables a pet to conveniently enter and exit the litter container. It has become increasingly popular to furnish litter boxes with a door assembly having a door for convenient access to the interior of the litter container.

SUMMARY

It has been discovered that in a litter container with an improved door connector is desired. In view of the state of the known technology, one aspect of the present disclosure is to provide a door connector for a litter container including a base portion and a hook. The base portion is configured to attach to an interior surface of a hood of the litter container. The hook is configured to attach to a cylindrical connector on the door. The base portion is configured to attach to the interior surface such that when connected the hook is at least partially hidden when viewed from an exterior of the litter container.

Another aspect of the present disclosure is to provide a litter container comprising a bottom portion, a top portion, a door including a cylindrical connector, and a door connector including a base portion configured to attach to an interior surface of the top portion and a hook configured to attach to the cylindrical connector on the door, the base portion configured to attach to the interior surface such that when connected the hook is at least partially hidden when viewed from an exterior of the litter container.

Embodiments of the present invention improve a user's experience with the hooded litter container.

BRIEF DESCRIPTION OF THE DRAWINGS

Referring now to the attached drawings which form a part of this original disclosure.

DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
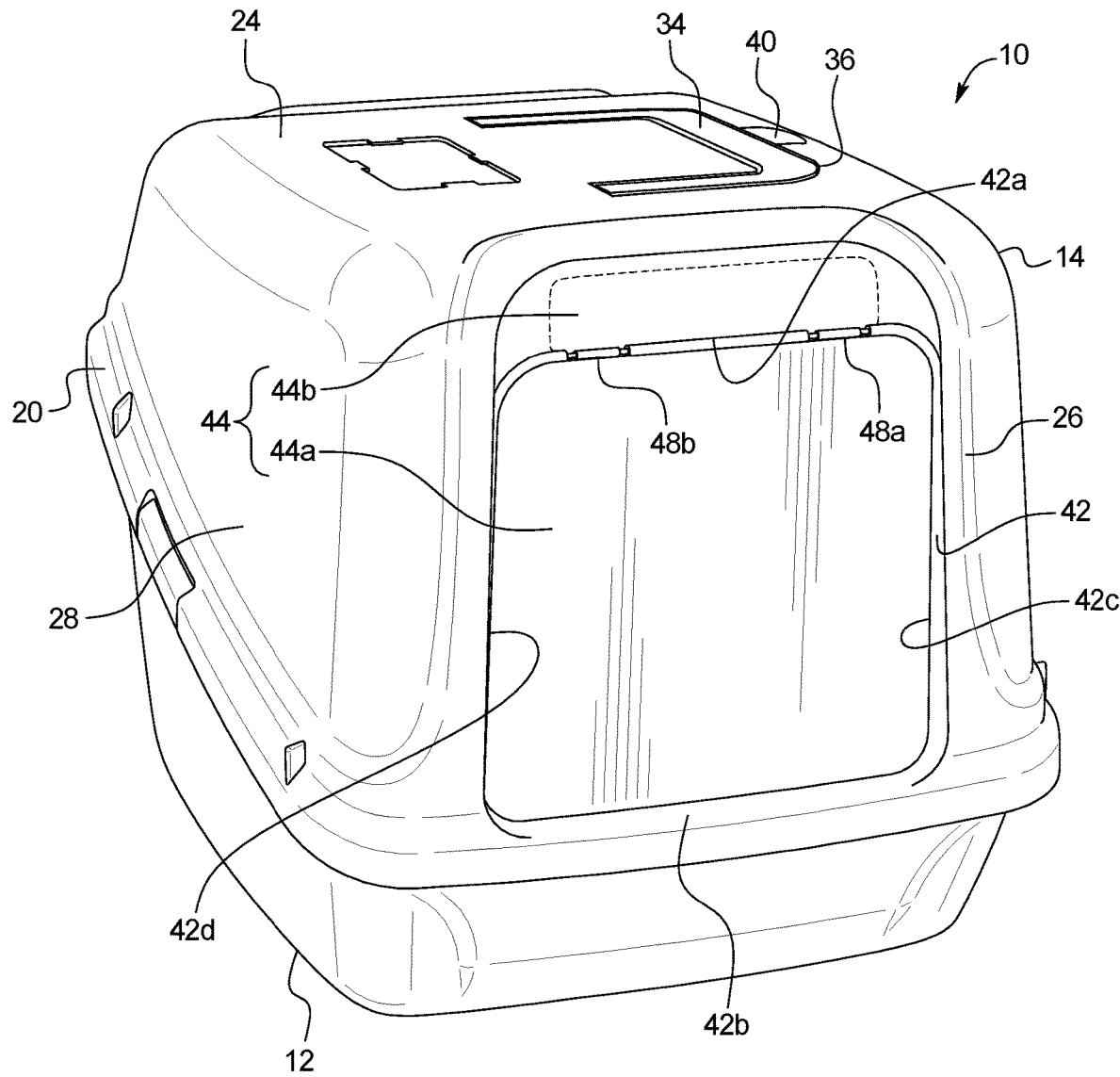
FIG. 1 is a top perspective view of a hooded litter container with a door connector according to one embodiment of the present invention.
Figure 2:
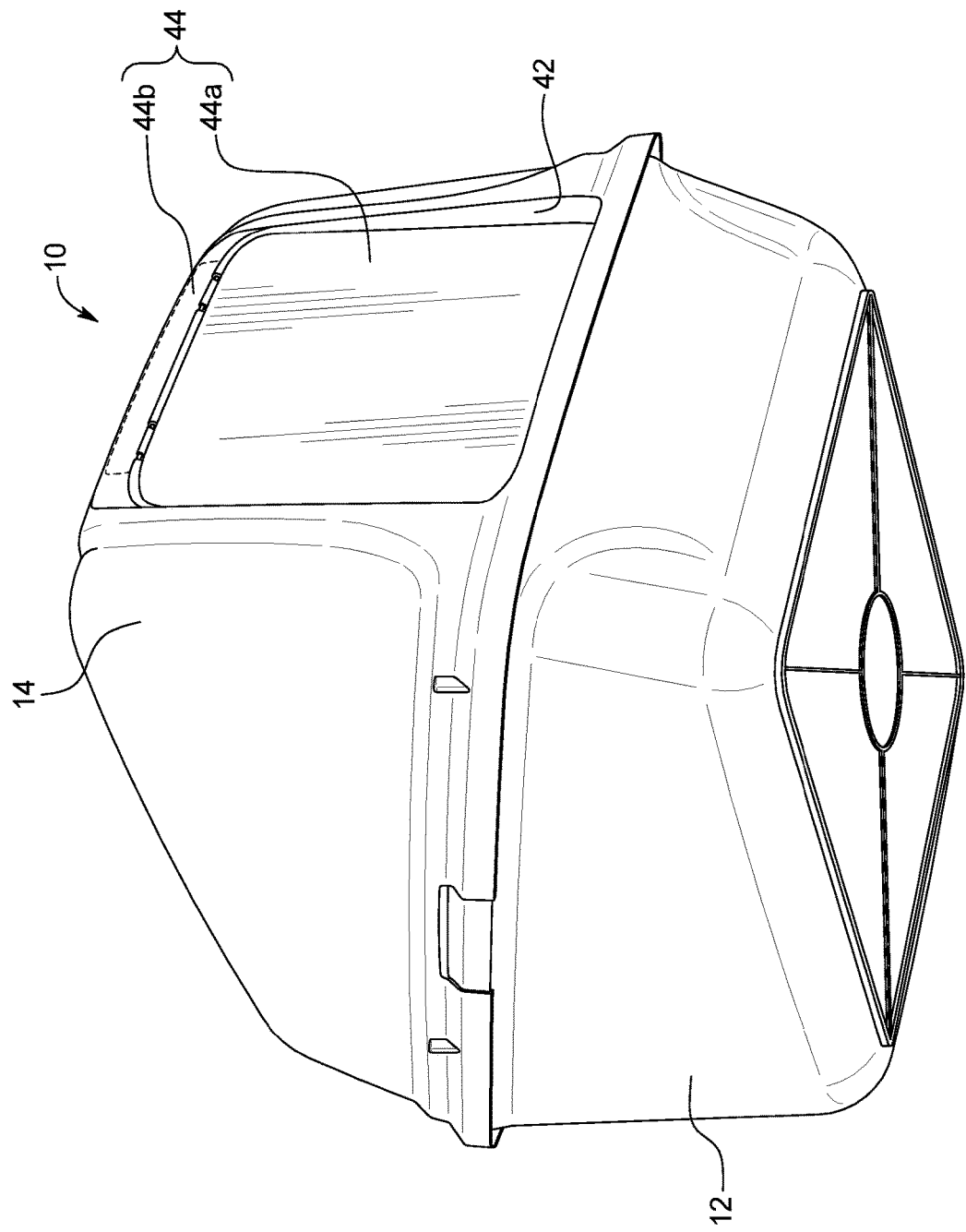
FIG. 2 is a bottom perspective view of the hooded litter container with the door connector as shown in FIG. 1.
Figure 3:
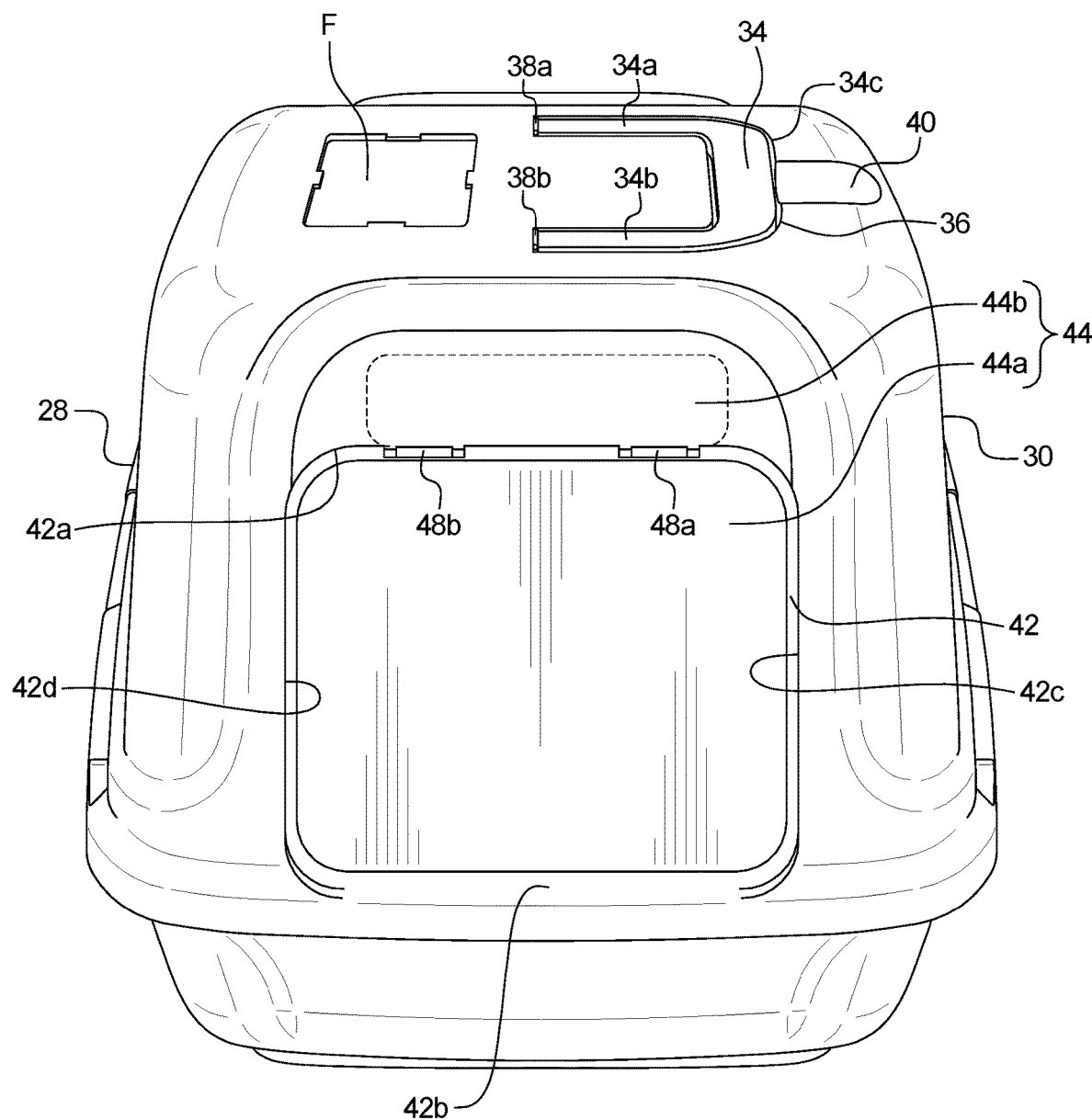
FIG. 3 is a front view of the hooded litter container with the door connector as shown in FIG. 1.

Referring initially to FIGS. 1-3, a litter container 10 is shown in accordance with an embodiment. The litter container 10 is preferably a covered lifter container. That is, in one embodiment, the lifter container 10 comprises a bottom pan 12 and a top portion or hood 14. The bottom pan or portion 12 has a first inner space 16 configured to contain cat litter L. The top portion 14 is configured to be disposed on top of the bottom pan 12. The top portion 14 has a second inner space 18 and is configured to be fixed to the bottom pan 12 along rimmed portions of the top and bottom pans 12 and 14. A top rimmed portion 20 of the top portion 14 is configured to overlie a corresponding bottom rimmed portion of the bottom pan 12. It will be apparent to those skilled in the art from this disclosure that the top and bottom pans 12 and 14 can also be configured with securing members such as clasps and the like as needed and/or desired.

When the top portion 14 is disposed on the bottom pan 12, the first and second inner spaces 16 and 18 form an interior space S of the litter container 10. Referring back to FIG. 1, as shown in the assembled state, the litter container 10 includes a top surface 24, a front surface 26, a back surface (not shown), two opposite facing side surfaces 28 and 30 disposed between the front and back surfaces, and a bottom surface 32.

The top portion 14 includes a handle member 34 disposed on the top surface 24. In the illustrated embodiment, the handle member 34 has a generally U-shaped configuration and is hinged so as to be able to fit within a complementarily shaped groove 36 in the top surface 24. When the handle member 34 is disposed within the groove 36, the handle member 34 can be considered to be in in a stowed position, and is generally flat or planar with the top surface 24. In other words, the handle member 34, when in the stowed position, and the top surface 24 are coplanar.

The handle member 34 can have a first part 34a connected to the top surface via a first hinge 38a and a second part 34b coupled to the top surface 24 via a second hinge 38b. The third part 34c of the handle member 34 is disposed between the first and second parts 34a and 34b. Thus, the first, second and third parts 34a, 34b and 34c of the handle member 34 form a U-shaped handle. The top surface 24 further includes a groove or depression 40 that enables a user to grip the underside of the third portion 34c of the handle member 34 and rotate the handle member 34 into a handle position. It is noted that the handle member 34 can be any suitable device as needed and/or desired. Alternatively, the top portion 12 can be modified to have no handle member. Preferably, the surface includes a filter F for neutralizing pet odor or at least openings to enable a flow of air into and out of the interior S. The filter F can be a foam material that is secured to the top surface 24 or that fits within an opening or recessed area in the top surface 24.

As can be understood, the front surface 26 of the top portion 14 includes an opening 42 in the litter container 10. In this embodiment, the opening 42 is generally rectangular and defines a top edge 42a, a bottom edge 42b and left and right side edges 42c and 42d. However, as can be understood, the opening 42 in the litter container 10 can be any shape and configuration, can be wholly in the top portion 14, wholly in the bottom portion 12 or defined by a combination of open portions in the top and bottom portions or in any manner desired.

As shown, in one embodiment, the litter container 10 contains a door assembly 44 disposed in a portion of the front surface 26. The door assembly includes a door 44a and a door connector 44b.

The door 42a is generally sized and configured to fit within and be congruent with the opening 44 in the top portion 14. Thus, in the illustrated embodiment, the door 44a is generally rectangular so as to fit within the opening 42. It is noted that the door 44a can be any desired size and shape, and can be larger, smaller or the same size as the opening. Moreover, the door 44a does not necessarily need to be the same shape as the opening 42, but preferably covers or blocks all or a majority of the opening 42 and can reduce the transmission of odor emitting form the interior space S of the litter container 10 and prevent some or all of the litter within the interior space S of the litter container 10 from being knocked or kicked out of the litter container 10.

Figure 5:
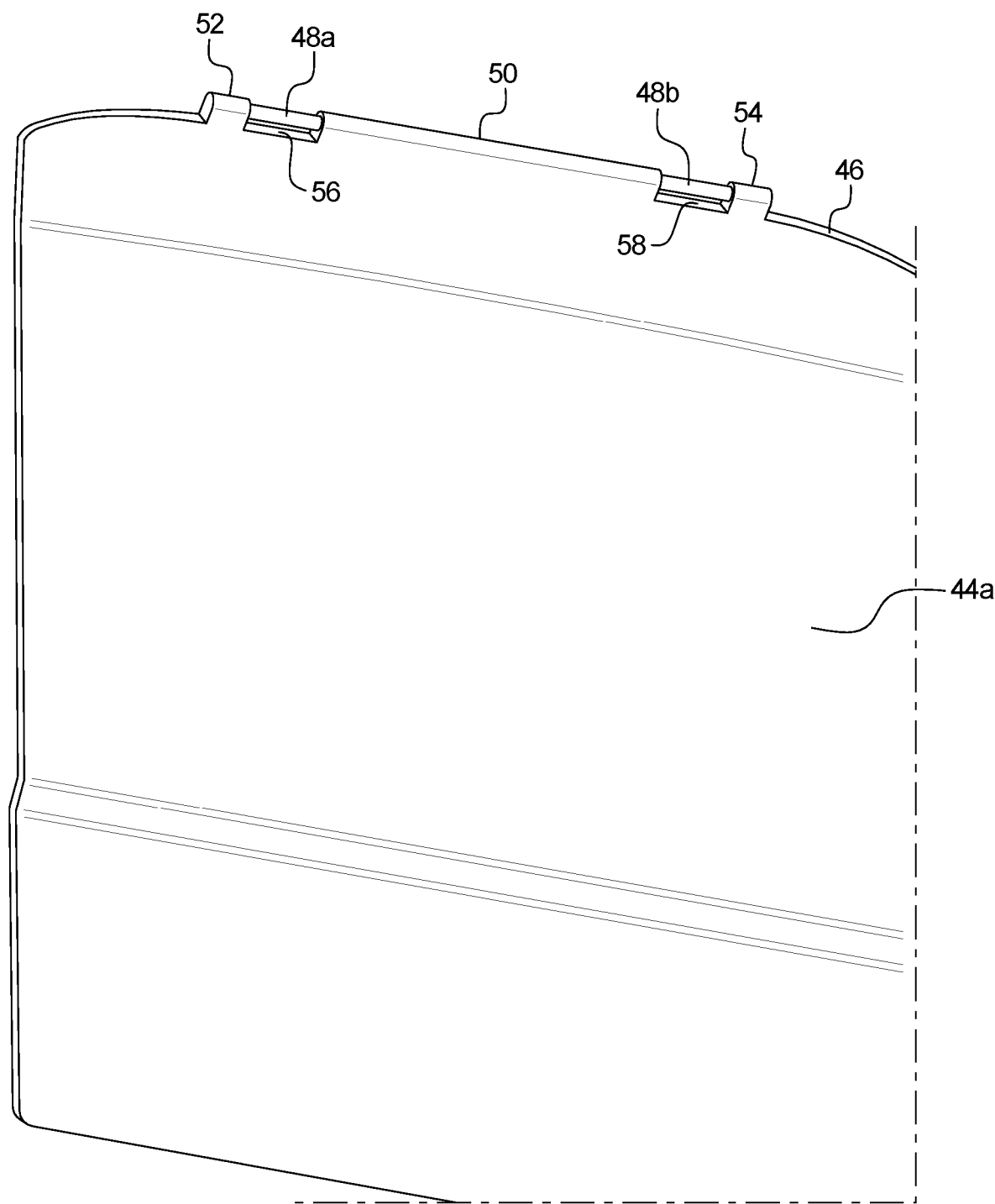
FIG. 5 illustrates the door of the hooded litter container of FIG. 1.

As shown in FIG. 5, the top edge 46 of the door 44a has a plurality of cylindrical connectors 48a and 48b; however, the top edge 46 can have as many or as few cylindrical connectors 48 as desired. In this embodiment, the door 44a has a first cylindrical connector and a second cylindrical connector 48b. The first and second cylindrical connectors 48a and 48b are spaced from each other and approximately midway between the center of the door 44a and a respective edge of the door 44a. In this embodiment, the top edge 46 of the door 44a as a central extension 50, a first or left extension 52 and a second or right extension 54. Thus, a first or left groove or space 56 is disposed between the first extension 52 and the central extension 50 and a second or right or right groove or space 58 is disposed between the second or right extension 54.

The first cylindrical connector 48a extends from the left extension 52 to the central extension 50 and thus spans the first groove 56. The second cylindrical connector 48b extends from the right extension 54 to the central extension 50 and thus spans the second groove 58. The first and second connectors 48a and 48b can be metal cylindrical extensions that are coupled with small openings in the extensions. In other words, each of the cylindrical connectors 48a and 48b can have a reduced diameter portion at each end that is configured to fit within openings in the sides of the extensions to hold the cylindrical connectors.

In another embodiment, each of the cylindrical connectors 48a and 48b is molded with the door 44a and thus a unitary one-piece member formed simultaneously or substantially simultaneously with the door 44a. However, the cylindrical connectors 48a and 48b can be any suitable structure, material and/or connectable or attached to the door 44a in any manner desired.

In one embodiment, the door 44a is a plastic molded piece. The door can be transparent, translucent, or opaque. When the door 44a is transparent or translucent it enables the pet to view through the opening 42 to the outside, thus preventing a sense of being closed within or trapped in the litter container 10. The door 44a can be tinted any suitable color or be opaque and colored in any manner desired. For example, the door 44a can be molded with a colored plastic material or painted or colored after molding. Moreover, the door 44a does not necessarily need to be plastic and can be any suitable material or materials.

Figure 6:
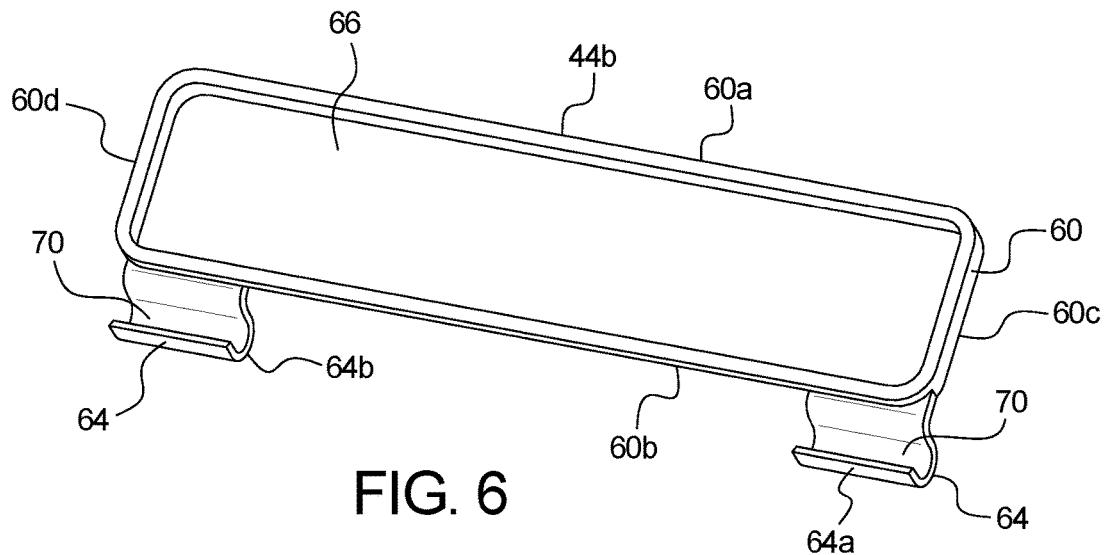
FIG. 6 illustrates the door connector of the hooded litter container of FIG. 1.
Figure 7:
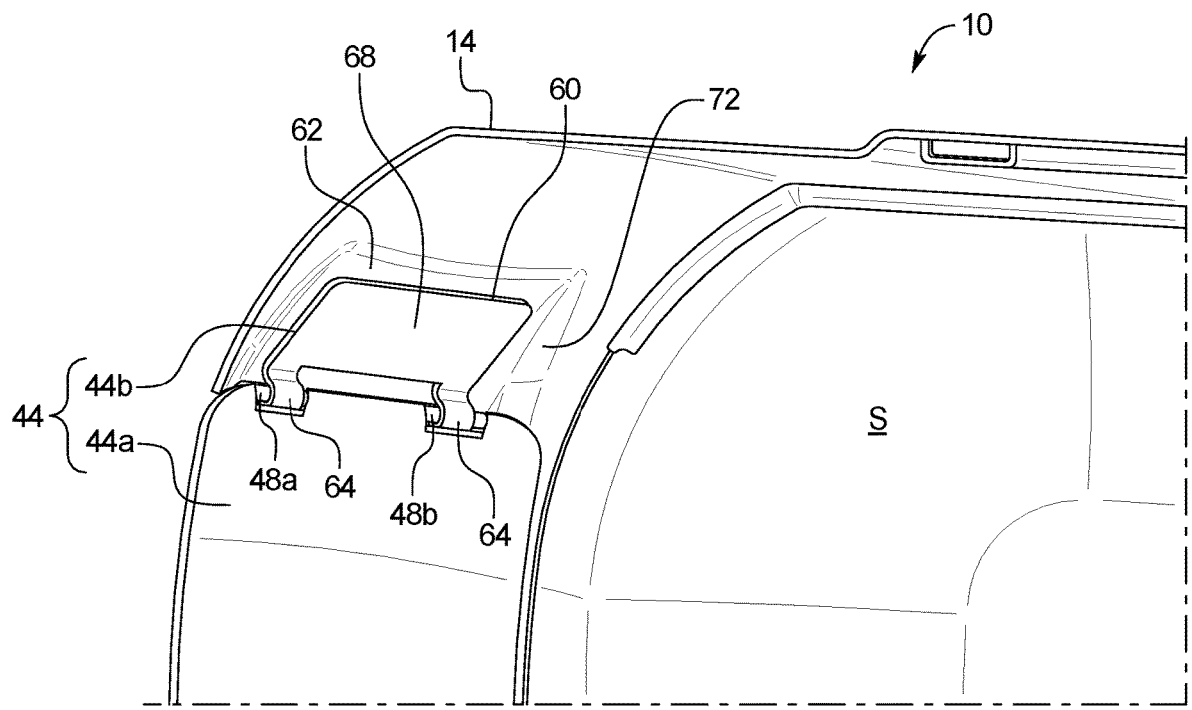
FIG. 7 is an interior view of the hooded litter container illustrating the door connector and hooks in a closed position.

As shown in FIGS. 6 and 7, the door connector 44b for a litter container 10 can include a base portion 60 configured to attach to an interior surface 62 of a top portion 14 of the litter container 10 and a plurality of hooks 64 configured to attach to cylindrical connectors 48a and 48b on the door 44a. The base portion 60 is preferably a plastic molded rectangular member that is molded separately from the top portion 14 of the litter container. Preferably, the hooks 64 and the base portion 60 are unitarily molded as a one-piece member; however, it is noted that the base portion 60 and the hooks 64 can be coupled together in any manner desired. As is illustrated, the door connector 44b has a front side 66 and a rear side 68 opposite the front side 66. The front side 66 of base portion 60 of the door connector 44b has a single continuous edge that includes a top edge 60a, a bottom edge 60b and left and right edges 60c and 60d. As shown in FIG. 6, the top, bottom, left and right edges 60a, 60b, 60c and 60d are connected to one another such that the edge of the front side 66 extends continuously around the front side 66 of the base portion 60. The top, bottom, left and right edges 60a-60d further extend in a direction forward from the front side 66 of the base portion 60 and away from the rear side 68.

The plurality of hooks 64 of the base portion 60 extend downwardly from the bottom edge 60b. However, the bottom edge 60b can have as many or as few hooks 64 as desired. In this embodiment, the door connector 44b has a first hook 64a and a second hook 64b. The first and second hooks 64a and 64b are spaced from each other and approximately midway between the center of the door and a respective edge of the door 44a. Thus, the first and second hooks 64a and 64b are configured and arranged to be position in the same position as the first and second cylindrical connectors 48a and 48b.

As can be understood, once the top portion 14, the bottom portion 12, the door 44a and the door connector 44b are molded, the litter container 10 can be assembled. The door connector 44b can be attached to the interior surface 62 of the top portion 14 using an adhesive, or in any suitable manner. The door connector 44b preferably is attached to the interior surface 62 of the top portion 14 such that the openings 70 in the hooks face outwardly toward the opening 42 in the top portion 14 and/or forward from the interior S. In this manner, the first and second hooks 64a and 64b are at least partially hidden when viewed from an exterior of the litter container 10.

Figure 8:
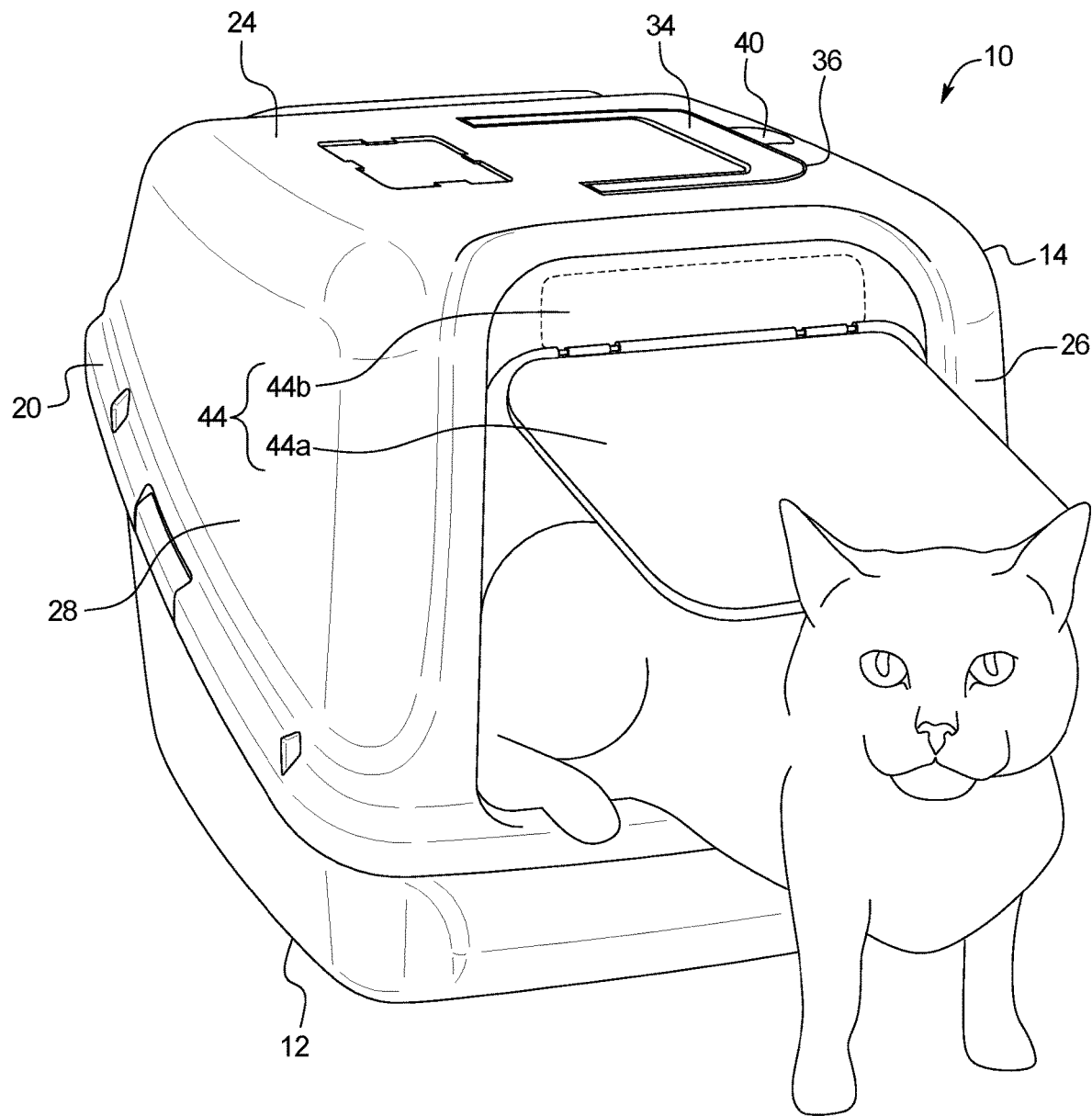
FIG. 8 is an interior view of the hooded litter container illustrating the door connector and hooks in an open position.

The cylindrical connectors 48a and 48b on the door 44a can then be inserted into the openings 70 in the hooks 64. The connection between the hooks 64 and the cylindrical connectors 48a and 48b can be a friction fit, a snap fit or any suitable connection. Based on the cylindrical shape of the cylindrical connectors 48a and 48b and the matching cylindrical configuration of the interior portion of the hooks 64, the door 44a is capable of swinging within the opening 42. In this embodiment, since the outer perimeter size of the door is slightly smaller than the inner perimeter size of the opening, the door is free to swing into or out of the opening, as shown for example in FIG. 8. Thus, a pet can easily enter or exit the litter container 10.

Figure 4:
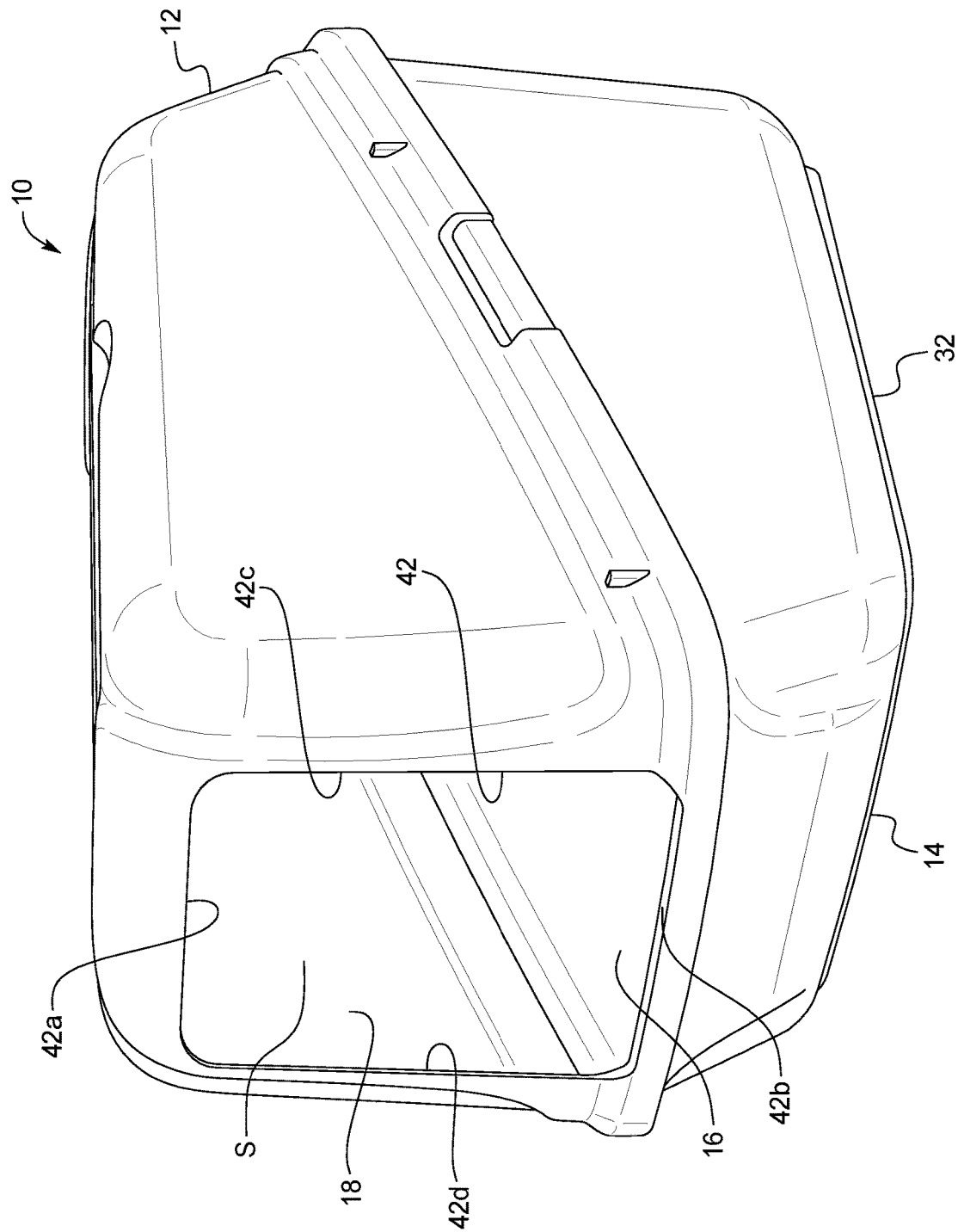
FIG. 4 is a side view of the hooded litter container of FIG. 1 with the door and the door connector removed.

Furthermore, since the cylindrical connectors 48a and 48b can be attached to the hooks 64, the door 44a can also be detached. Thus, in one embodiment, the hooks 64 are configured to enable the door 44a to be removably attached, as illustrated in FIG. 4. The hooks 64 are also configured and arranged, such that when the door 44a is freely hanging the door 44a is positioned within the edges 42a-42d of the opening 42. That is, the door 44a and the front surface 26 of the top portion 14 are generally planar. Such a configuration enables the door 44a to prevent litter from being knocked or kicked out of the interior S of the litter container 10 and helps prevent any odors from escaping the interior S of the litter container 10.

In one embodiment, as shown in FIG. 7, the top portion 14 at the area where the door connector 44b is attached can have an extended portion 72. That is, a wedged shaped extension 72 that extends from the front surface 26. This wedge-shaped extension 72 enables the base portion 60, along with the wedged shaped extension 72 to operate as a handle to lift the top portion 14 or the entire litter container 10.

In the scope of the present invention, the term "comprising" and its derivatives, as used herein, are intended to be open ended terms that specify the presence of the stated features, understanding elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "portion," "member" or "element" when used in the singular can have the dual meaning of a single part or a plurality of parts.

The term "configured" as used herein to describe a component, section or part of a device includes hardware and/or software that is constructed and/or programmed to carry out the desired function.

The terms of degree such as "substantially" and "generally" as used herein mean a reasonable amount of deviation of the modified term such that the result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in an embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A door connector for a litter container, comprising:
a base portion having a front side and a rear side, the front side having top, bottom, left and right edges are connected to one another thereby extending continuously around the front side, the top, bottom, left and right edges further extending in a direction forward from the front side of the base portion and away from the rear side, the front side of the base portion being configured to attach to an interior surface of a hood of the litter container; and
a pair of hooks extending in downward and rearward directions from the rear side of the base portion adjacent to the bottom edge having corresponding openings configured for a removable snap fit attachment to a cylindrical connector on a door of the litter container such that the pair of hooks are below the base portion,
the base portion configured to attach to the interior surface such that when connected the pair of hooks are at least partially hidden when viewed from an exterior of the litter container.

2. The door connector according to claim 1, wherein the pair of hooks and the base portion are unitarily molded as a one-piece member.

3. The door connector according to claim 1, wherein the base portion is configured to operate as a handle to lift the hood.

4. A litter container, comprising:
a bottom portion;
a top portion;
a door including a cylindrical connector; and
a door connector including a base portion and a pair of hooks, the base portion having a front side and a rear side, the front side having top, bottom, left and right edges that are connected to one another thereby extending continuously around the front side, the top, bottom, left and right edges further extend in a direction forward from the front side of the base portion and away from the rear side, the front side of the base portion, the base portion being configured to attach to an interior surface of the top portion, the pair of hooks extending in downward and rearwards direction from the rear side of the base portion adjacent to the bottom edge such that the pair of hooks are below the base portion and the pair of hooks being configured to attach to the cylindrical connector on the door, each of the pair of hooks defining an opening such that the cylindrical connector on the door is snap fitted to the pair of hooks through the openings such that the door is removably attached to the pair of hooks and the base portion, and
the base portion configured to attach to the interior surface such that when connected the hook is at least partially hidden when viewed from an exterior of the litter container.

5. The litter container according to claim 4, wherein the pair of hooks and the base portion are unitarily molded as a one-piece member.

6. The litter container according to claim 4, wherein the base portion is configured to operate as a handle to lift the hood.

7. The litter container according to claim 4, wherein the top portion includes a pivotable upper portion.

8. The litter container according to claim 7, wherein the pivotable upper portion includes the door connector.

9. The litter container according to claim 7, wherein the pivotable upper portion is configured to enable access to the interior or the litter container.

10. The litter container according to claim 4, wherein the door is transparent.

* * * * *